US008664899B2

(12) United States Patent
Doyama et al.

(10) Patent No.: US 8,664,899 B2
(45) Date of Patent: Mar. 4, 2014

(54) MOTOR DRIVE CONTROL DEVICE

(75) Inventors: Yoshiaki Doyama, Osaka (JP);
Yoshinori Takeoka, Shiga (JP);
Hidehisa Tanaka, Shiga (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 12/676,694

(22) PCT Filed: May 15, 2009

(86) PCT No.: PCT/JP2009/002146
§ 371 (c)(1),
(2), (4) Date: Mar. 5, 2010

(87) PCT Pub. No.: WO2009/139183
PCT Pub. Date: Nov. 19, 2009

(65) Prior Publication Data
US 2010/0253260 A1    Oct. 7, 2010

(30) Foreign Application Priority Data

May 15, 2008    (JP) .................................. 2008-128502

(51) Int. Cl.
*H02P 23/12*    (2006.01)
(52) U.S. Cl.
USPC ............ 318/400.14; 318/400.01; 318/400.13; 318/700
(58) Field of Classification Search
USPC .................. 318/400.01, 400.13, 400.14, 700
See application file for complete search history.

(56) References Cited

U.S. PATENT DOCUMENTS

| 6,121,736 A | 9/2000 | Narazaki et al. |
| 7,042,821 B2 | 5/2006 | Takayama et al. |
| 7,099,247 B2 | 8/2006 | Takayama et al. |
| 7,227,320 B2 | 6/2007 | Takayama et al. |
| 2001/0040466 A1* | 11/2001 | Ide .................................. 326/83 |
| 2002/0186631 A1 | 12/2002 | Takayama et al. |
| 2005/0280379 A1 | 12/2005 | Takayama et al. |
| 2005/0286371 A1 | 12/2005 | Takayama et al. |
| 2006/0197480 A1* | 9/2006 | Mori et al. ..................... 318/254 |

FOREIGN PATENT DOCUMENTS

| JP | 8-140391 | 5/1996 |
| JP | 2002-369575 | 12/2002 |
| JP | 2005-204383 | 7/2005 |
| JP | 2005-354878 | 12/2005 |
| JP | 2007-189862 | 7/2007 |

OTHER PUBLICATIONS

International Search Report issued Jul. 21, 2009 in International (PCT) Application No. PCT/JP2009/002146.
International Preliminary Report on Patentability issued Jan. 20, 2011 in International (PCT) Application No. PCT/JP2009/002146.
Extended European Search Report issued Mar. 1, 2013 in European Application No. 09746390.5.

* cited by examiner

*Primary Examiner* — Kawing Chan
(74) *Attorney, Agent, or Firm* — Wenderoth, Lind & Ponack, L.L.P.

(57) ABSTRACT

To present a motor drive control device capable of realizing high speed driving by a simple power feeding control method. The motor drive control device of the invention has a three-phase full bridge circuit for adjusting the feeding phase so as to invert the terminal voltage in feeding-off time, by cyclically repeating positive direction feeding period, non-feeding period, negative direction feeding period, and non-feeding period. In high speed driving, the phase is adjusted so as to invert the terminal voltage right after feeding-off, and if not reaching the desired rotating speed, the feeding time is shortened. As a result, the phase angle to the actual applied voltage can be advanced, and high seed rotation by weak-field system driving is realized.

9 Claims, 8 Drawing Sheets

WHEN CURRENT FLOWS INTO MOTOR

(a)

WHEN CURRENT RETURNS FROM MOTOR (b)

PRIOR ART
Fig.7

MOTOR DRIVE CONTROL DEVICE

TECHNICAL FIELD

The present invention relates to a motor drive control device for driving without using a sensor for detection of magnetic pole positions of a synchronous motor containing a permanent magnet in a rotor (hereinafter called a motor), more particularly to a motor drive control device for driving in a wide range from low speed to high speed without changing the output voltage of a drive circuit moment by moment.

BACKGROUND ART

Conventionally, to drive a motor of this type, using pulse width modulation, a voltage of pseudo-sinusoidal wave is generated and applied, and the momentary value of obtained sinusoidal current, the applied voltage, and the parameter model of the motor are used, and by re-calculation from the parameter model, the current value of the model output and the applied voltage of the model output are obtained, and by feedback calculation so as to modulate the estimated phase information until the error from the model output becomes zero, and thereby the magnetic pole position is estimated (see, for example, non-patent document 1).

Figure 7:
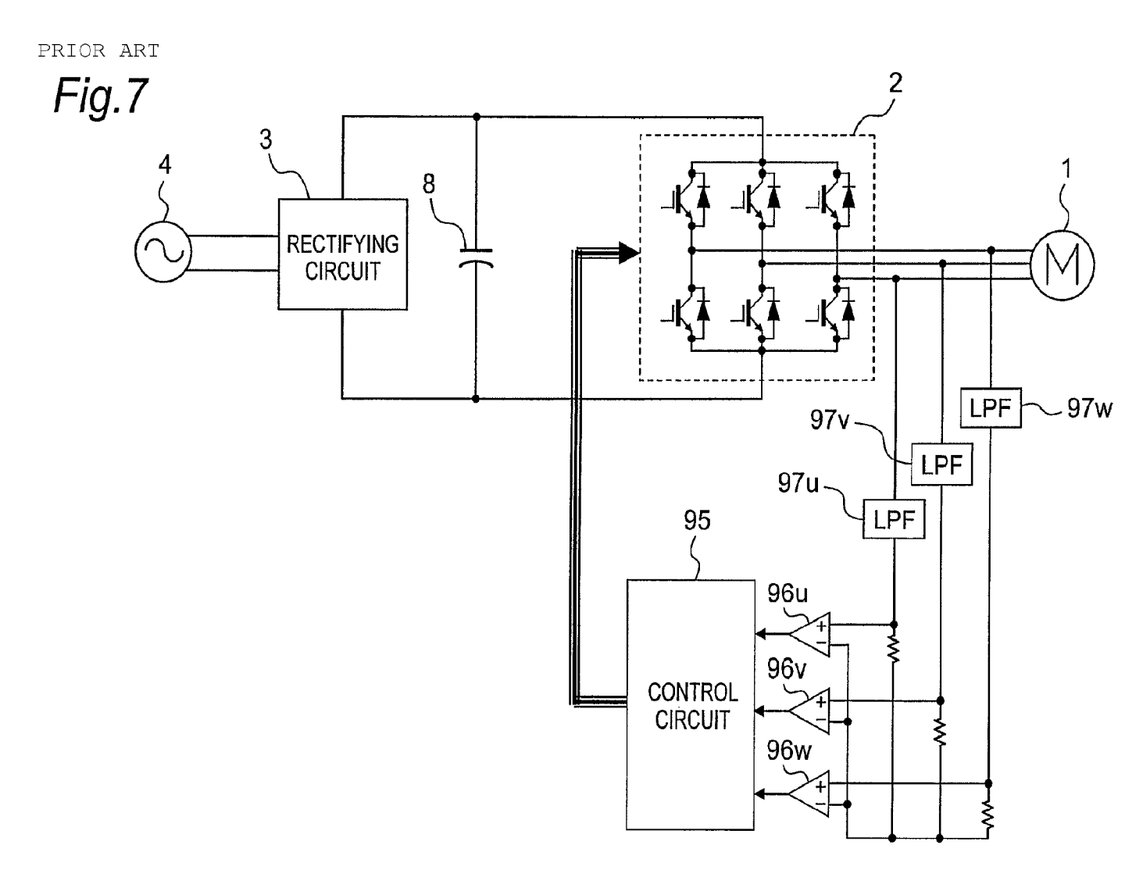
FIG. 7 is an overall circuit diagram of a conventional motor drive control device.

In a simpler method, specific voltage are applied in a partial period only, for example, at an electrical angle of 120 degrees, the voltage of the terminal is detected when voltage is not applied, and the magnetic pole position is calculated (see, for example, non-patent document 2). FIG. 7 shows a conventional motor drive control device according to non-patent document 2. As shown in FIG. 7, in the conventional motor drive control device, an alternating-current power supply 4 is rectified by a rectifying circuit 3, and is smoothed by a capacitor 8, and a direct current is obtained. The direct current is supplied into a three-phase bridge circuit 2, and is further applied into a control circuit 95, and a semiconductor switch in the three-phase bridge circuit 2 is turned on or off, and thereby a dummy three-phase alternating current is applied to a motor 1. This dummy three-phase alternating current is an alternating current cyclically repeating positive direction feeding, feeding off, negative direction feeding, and feeding off. To detect the magnetic pole positions of the motor 1, the voltages in non-feeding period is filtered by filters (97u, 97v, 97w), and compared in comparators (96u, 96v, 96w) with the reference voltage or the average of three voltages, and the magnetic pole positions are directly detected from the induced voltage waveform.

Non-patent document 1: Collected papers of Society of Electric Engineers, D, vol. 117, No. 1, 1997, pp. 98-104.
Non-patent document 2: Eiichi Ono, "Introduction to power electronics" (3rd ed.), Ohm-Sha, Aug. 20, 1997, pp. 242-244

SUMMARY OF THE INVENTION

However, in the configuration in non-patent document 1, the motor current must be always detected, and since it is based on the sinusoidal wave current, the applied voltage must be changed moment by moment, and the control calculation is complicated. In the configuration in non-patent document 2, in the feeding-off period, a relatively long period is needed when the phase current of the motor is zero and at that time changes of terminal voltage can be detected. As a result, the required rotating speed becomes higher, and if a weak-field system control that is used when the direct-current voltage is insufficient is attempted, while the applied direct current is turned off, the motor current zero period cannot be extended relatively long, and while the motor generated voltage is sufficiently higher than the direct-current voltage, weak-field system control is difficult.

The invention is intended to solve the conventional problems, and it is hence an object thereof to present a motor drive control device capable of realizing weak-field system drive while keeping constantly the voltage generated by the inverter.

To solve the conventional problems, the motor drive control device of the invention has a three-phase full bridge circuit composed of elements having diodes for passing currents in reverse direction provide in parallel to each switching element, for converting a direct-current power supply, or a dummy direct-current power supply obtained by rectifying and smoothing or an alternating-current supply, into a dummy three-phase alternating current of arbitrary voltage and arbitrary frequency in the three-phase full bridge circuit, and driving the motor at a desired rotating speed, in which the dummy three-phase alternating current is a dummy three-phase alternating current cyclically repeating positive direction feeding period, non-feeding period, negative direction feeding period, and non-feeding period in each phase, further including a control circuit for detecting the terminal voltage of the motor in non-feeding period, obtaining the time of change of terminal voltage from positive to negative as the time of change of corresponding phase current from negative to positive, obtaining the time of change of terminal voltage from negative to positive as the time of change of corresponding phase current from positive to negative, and adjusting the phase of applied voltage so that the difference between the current phase based on each obtained current change time and the phase of alternating current (dummy three-phase alternating-current voltage) at the motor generated as a result voltage application may be a desired value. Therefore, if the induced voltage cannot be estimated from the terminal voltage in non-feeding period, the current phase of the motor may be known, and by keeping the current phase and the voltage phase in a desired relation, the motor can be driven stably.

In the dummy three-phase alternating current, the absolute value of terminal voltage generated from each bridge in feeding period may be a constant voltage with respect to a neutral point potential of the direct-current portion. Therefore, it is not required to changed the applied voltage moment by moment, and the motor can be driven stably in a simple configuration.

The absolute value of terminal voltage generated from each bridge in the feeding period may be adjusted on the basis of the deviation between an actual rotting speed and a desired rotating speed. Therefore, a desired rotating speed is obtained.

When an actual rotating speed is lower than a desired rotating speed if the absolute value of the terminal voltage is to a maximum possible value, the ratio of non-feeding period may be increased, and the feeding start phase may be adjusted so that the current polarity may be inverted almost right after coming into non-feeding period. Therefore, the actual voltage applied to the motor is not lowered, and the current phase may be advanced, and weak-field system drive is realized, and the driving range is extended.

The motor drive control device may further include input detecting means for detecting an input current or an input power of the motor drive control device or a system including the motor drive control device. In this case, an upper limit is provided for increasing the ratio of the non-feeding period on the basis of the calculated value of the output of the input detecting means divided by the rotating speed. The value of the input power divided by the rotating speed corresponds almost to the torque of the motor, and it is possible to know the load torque which is a parameter for determining the limit of stability of position sensor-less operation in weak-field system control, and stable driving is realized in a wide range up to the limit of weak-field system driving.

Of the input power, if approximate values of power consumed in other parts than the motor driving are known preliminarily, the value subtracting the portion of the power consumed in other parts than the motor driving from the output of the input detecting means may be used as the output of the input detecting means. Therefore, the torque actually generated in the motor can be estimated more precisely, and stable driving is realized in a wide range up to the limit of weak-field system driving.

If the absolute value (absolute value of terminal voltage) of applied voltage to the terminal generated in the feeding period is smaller than a maximum possible value, and when the desired rotating speed is realized, the ratio of the feeding period is increased, and the feeding is started almost right after the terminal voltage in the non-feeding period is inverted, by controlling the feeding phase. Therefore, when the rotating speed is low and there is a sufficient allowance for applied voltage, an appropriate phase relation is maintained between the voltage and the current, and driving at high efficiency is realized.

The motor drive control device may further include input detecting means for detecting an input current or an input power of the motor drive control device or a system including the motor drive control device, and the phase difference (reference phase difference) between the non-feeding starting phase, and the phase of inverting the terminal voltage in non-feeding period may be determined on the basis of the calculated value of the output of the input detecting means divided by the rotating speed. Therefore, if the load torque fluctuates, an appropriate phase relation depending on the torque is maintained, and driving at high efficiency is realized in a wide range of torque.

Of the input power, if approximate values of power consumed in other parts than the motor driving are known preliminarily, the value subtracting the portion of the power consumed in other parts than the motor driving from the output of the input detecting means may be used as the output of the input detecting means. Therefore, if the load torque fluctuates, an appropriate phase relation depending on the torque is maintained, and driving at high efficiency is realized in a wide range of torque.

In the motor drive control device, a dummy three-phase alternating current cyclically repeating positive direction feeding period, non-feeding period, negative direction feeding period, and non-feeding period in each phase may be applied at the time of starting, the applied voltage width is adjusted so that the terminal voltage may be inverted in non-feeding period, and the operation may also include a step of confirming that the terminal voltage is inverted almost securely in the non-feeding period. Therefore, from the beginning of starting, driving by the same detecting means is realized, and the drive control circuit is simplified.

According to the motor drive control device of the invention, without having to detect the momentary current, weak-field system drive in a wide range is realized because the detection range of current phase is wide, and a high efficiency driving at medium and low speed and a wide driving range are obtained.

DESCRIPTION OF REFERENCE NUMERALS

1 Motor
2 Three-phase bridge circuit
3 Rectifying circuit
4 Alternating-current power supply
21 Current detecting means
22 Amplitude detecting means
25 Control circuit
26$u$, 26$v$, 26$w$ Comparator

DETAILED DESCRIPTION OF THE INVENTION

Preferred embodiments of the invention are specifically described below while referring to the accompanying drawings. It must be noted however that the invention is not limited by these embodiments alone.

(Embodiment 1)

Figure 1:
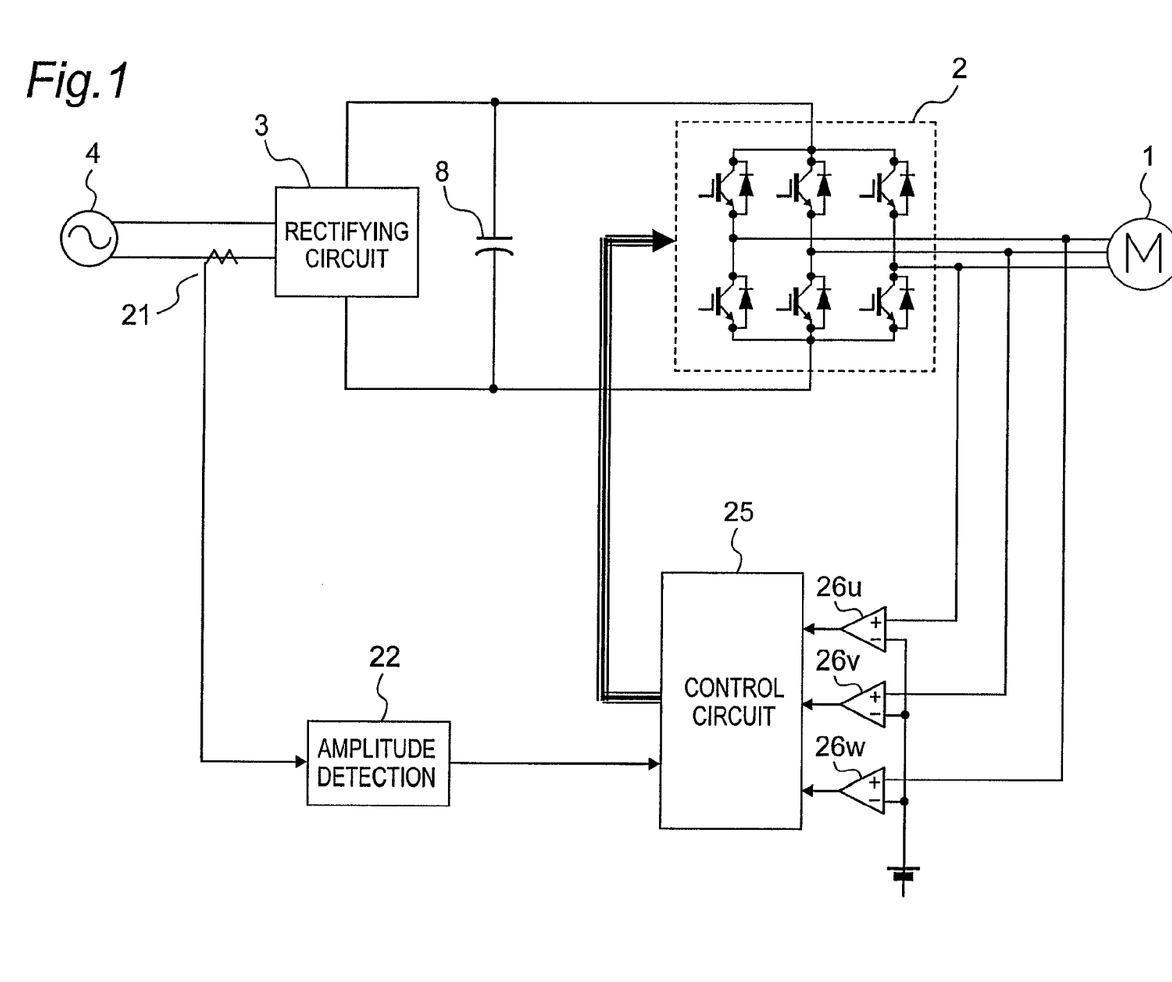
FIG. 1 is an overall circuit diagram of motor drive control device in embodiments 1 to 4 of the invention.

FIG. 1 is a circuit block diagram of the motor drive control device in embodiment 1 of the invention. The configuration of the motor drive control device shown in FIG. 1 is common to the following embodiments 2 to 4. In FIG. 1, an alternating-current supply 4 is rectified by a rectifying circuit 3, and is smoothed by a capacitor 8, and a direct-current power supply is composed. The direct-current power supply is connected to a three-phase bridge circuit 2, and the output of the three-phase bridge circuit 2 is connected to a motor 1. The three-phase bridge circuit 2 has a total of six elements, having two elements in each phase. Each element of the three-phase bridge circuit 2 is composed in parallel connection with diodes capable of passing currents in reverse direction of the semiconductor switch. A control circuit 25 controls the three-phase bridge circuit 2, and inputs the information of comparison of three outputs of the three-phase bridge circuit 2 with the reference voltage in comparators 26$u$, 26$v$, 26$w$, and estimates the rotation status of the motor 1, and control the three-phase bridge circuit 2, thereby driving the motor 1 appropriately. By using the outputs from current detecting means 21 for detecting the current flowing in from the alternating-current power supply 4 and amplitude detecting means 22 for detecting the amplitude of this current, control of high precision of the control circuit 25 may be realized.

Figure 2:
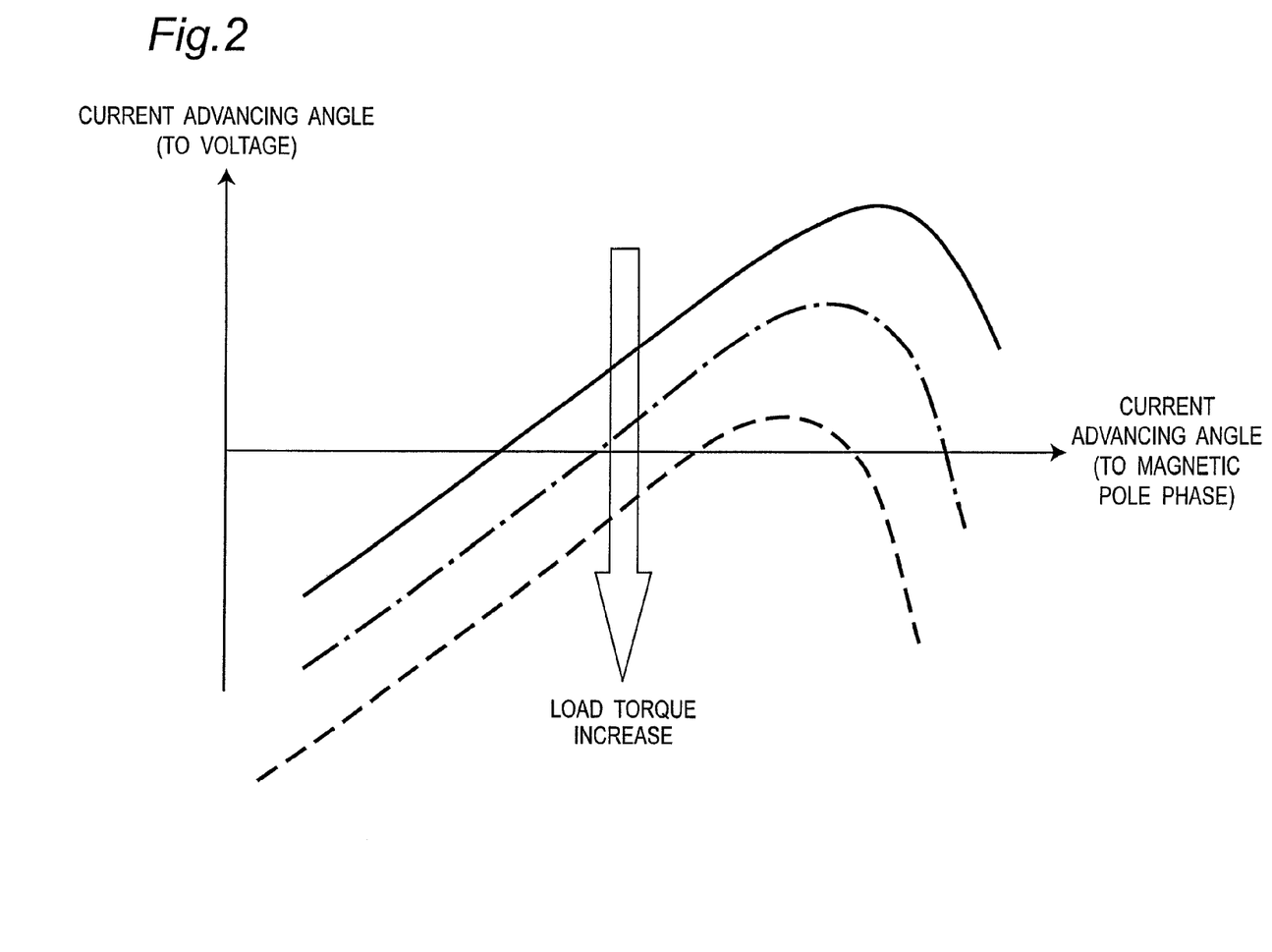
FIG. 2 is a characteristic diagram showing the electric advancing angle characteristic in embodiments 1 and 2 of the invention.

Prior to explanation about the operation of the control circuit 25, the basis principle of this driving system is explained. FIG. 2 shows a current advancing angle characteristic of current advancing angle to the magnetic pole phase of the motor and the applied voltage in the condition of same rotating speed and same torque. To drive the motor efficiently, a larger torque should be generated at a same current, and it is hence ideal to drive so that the magnetic pole phase and the current phase may be matched. However, in an efficient driving system, if attempted to drive at high speed, a higher applied voltage is needed, and the circuit is increased in size. Therefore, if a high efficiency is not demanded particularly in high speed driving, the current is advanced with respect to the magnetic pole phase, which is known as weak-field system driving. By weak-field system driving, the applied voltage to the motor can be suppressed, and circuit of high voltage is not needed. In the invention, however, since it is desired to omit the means for detecting the magnetic pole phase, the magnetic pole phase cannot be detected directly, and the current advancing angle cannot be controlled directly. However, as clear from the characteristic diagram in FIG. 2, if the current advancing angle to the magnetic pole phase is increased, the current advancing angle to the applied voltage is also increased. Accordingly, when the phase difference of applied voltage and current is kept at a desired value, both high efficiency driving and weak-field system driving can be realized.

Figure 3:
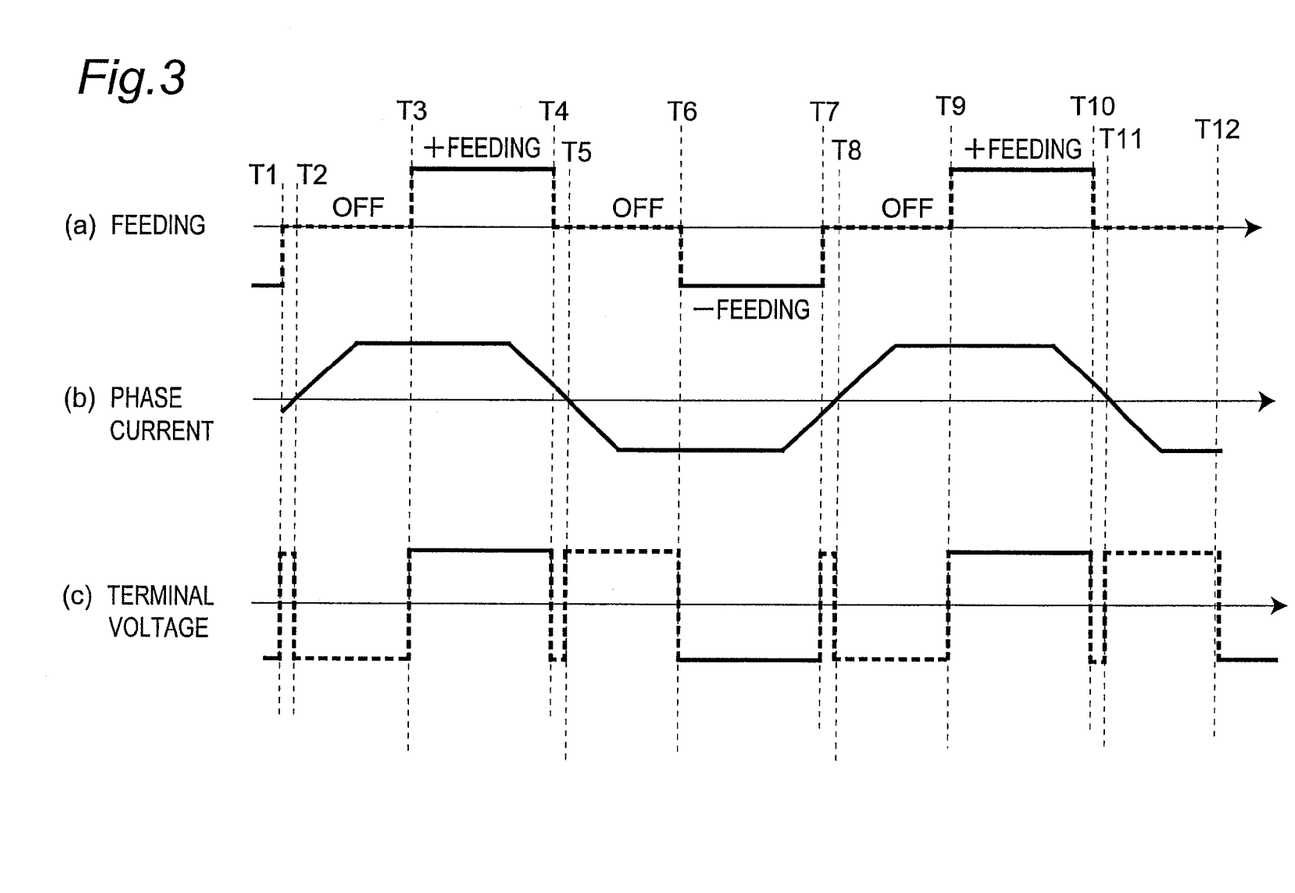
FIG. 3 is a waveform diagram of output signal of the motor drive control device in embodiment 1 of the invention.

FIG. 3, (a) to (c) are waveform diagrams for explaining the operation of the control circuit 25. In the control circuit 25, in each phase, operations are cyclically repeated in feeding off, normal direction feeding, feeding off, and negative direction feeding. FIG. 3(a) shows a feeding waveform, in which the feeding-off period is from time T1 to time T3, from time T4 to time T6, from time T7 to time T9, and from time T10 to time T12, the positive direction feeding period is from time T3 to time T4 and from time T9 to time T10, and the negative direction feeding period is from time T6 to time T7. FIG. 3(b) shows the current waveform in this phase, in which the current flows in the positive direction from time T2 to time T5, and from time T8 to time T11, and the current flows in the negative direction in other periods. FIG. 3(c) shows the waveform of terminal voltage at this time. By the semiconductor switch, when the power is fed in the positive direction or the negative direction, the terminal voltage is same as the feeding voltage, but in the feeding-off period, the terminal voltage waveform varies depending on the state of the current. In FIG. 3, the waveform is shown in solid line while being fed, and in dotted line in feeding-off period.

Figure 4:
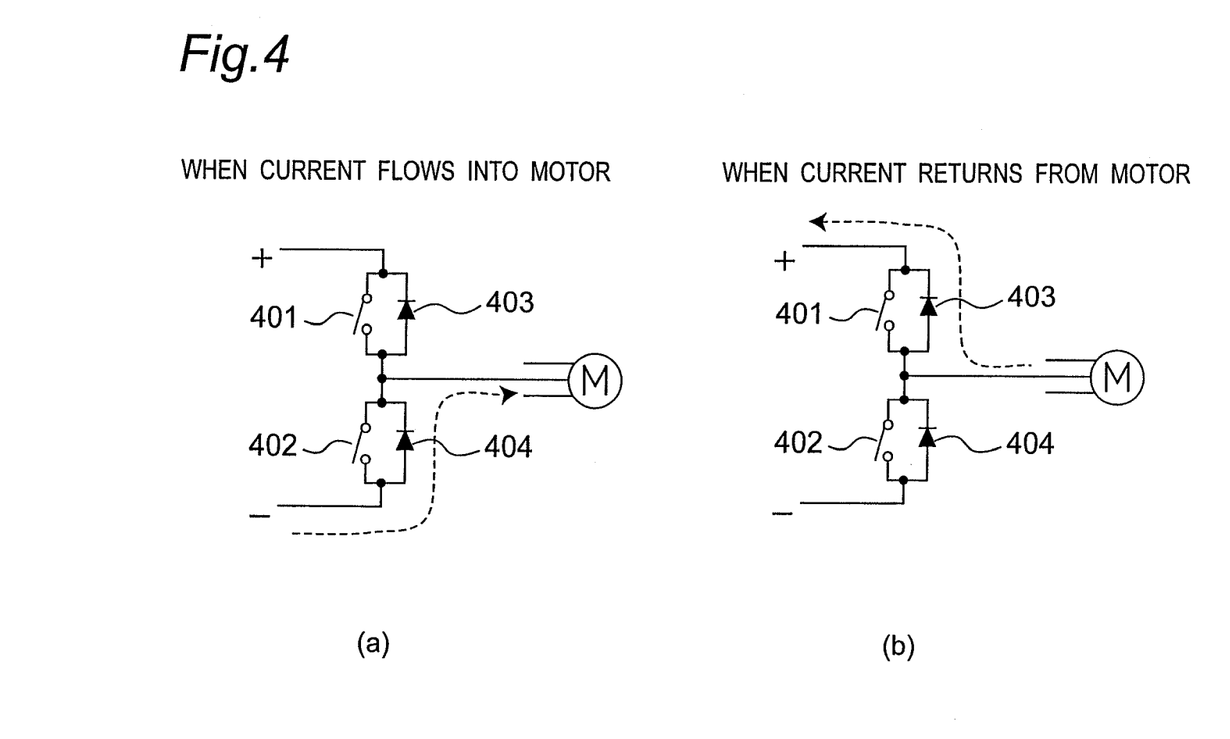
FIG. 4 is a circuit diagram for explaining the principle of operation in embodiment 1 of the invention.

FIG. 4 shows the principle of such change. FIG. 4(a) shows the current flowing from the bridge circuit to the motor 1. In this case, switches 401 and 402 are off, and the current flows into the motor 1 by way of a diode 404. By this diode 404, the motor terminal and the minus terminal of the direct-current power supply are conducting, and the terminal voltage is equal to the minus terminal of the direct-current power supply. FIG. 4(b) shows the current flowing back from the motor. In this case, through a diode 403, by conducting to the plus terminal of the direct-current power supply, the terminal voltage is equal to the plus terminal of the direct-current power supply.

According to this principle, the waveform in FIG. 3(c) is explained, that is, at time T1, when the negative direction feeding is cut off, the current is flowing in the negative direction, and the terminal voltage has a plus potential of direct-current voltage. At time T2, the current polarity is inverted, and the terminal voltage has a minus potential of direct-current voltage. At time T3, in positive direction feeding, the terminal voltage has a plus potential of direct-current voltage. At time T4, by turning off the feeding, the current is positive, and the terminal voltage has a minus potential of direct-current voltage. At time T5, the current polarity is inverted, and the terminal voltage has a plus potential of direct-current voltage. At time T6, in negative direction feeding, the terminal voltage has a minus potential of direct-current voltage. The control circuit 25 thus controls feeding, and in particular, the next feeding start time is controlled so that to shorten the time from feeding-off to inverting of current phase (for example, from T1 to T2, from T4 to T5, or from T7 to T8) as much as possible. If the time from feeding-off to inverting of current phase is longer than desired, the next feeding start time is advanced. At this time, the terminal voltage shows a waveform almost free from feeding-off time. Further, the current phase may be advanced from the voltage phase by the portion from feeding start phase and current inverting phase to next feeding start phase.

If failing to reach a desired rotating speed in spite of such driving, the rate of feeding period is lowered. By shortening the feeding period, the time from the current inverting phase to next feeding start phase becomes longer, and the current advancing angle based on the voltage can be further increased. As a result, the current advancing angle to the magnetic pole phase can be increased, and the weak-field system driving range can be extended.

In this manner, by shortening the period from feeding-off to current polarity converting, as shown in the terminal voltage waveform in FIG. 3 (c), a rectangular voltage of maximum voltage is obtained in both polarity, and a high voltage is applied to the motor. Hence, while realizing a maximum applied voltage, both weak-field system driving and high speed driving are possible.

(Embodiment 2)

In this embodiment, the control circuit 25 in FIG. 1 makes use of the outputs from the current detecting means for directing the current flowing in from the alternating-current power supply 4, and from the amplitude detecting means 22 for detecting the amplitude of this current, and control of higher precision is realized. This is particularly effective means when the motor torque range is wider. FIG. 2 also shows the current phase characteristic when the load torque is changed. When the torque increases, the current advancing angle to the voltage becomes smaller, and the deflection point of the current advancing angle to the voltage is moved to the smaller current advancing angle side. The driving control for keeping constant the phase of current to voltage cannot surpass the deflection point, it is desired to have a preliminary knowledge about location of the deflection point in order to realize driving in a wider range. Accordingly, the current detecting means 21 is provided at the input of the motor drive device, and the amplitude of the detected output is detected by the amplitude detecting means 22, so that the input current value may be known in the control circuit 25.

Moreover, since the voltage of the alternating-current power supply 1 is almost constant, the input current is nearly equivalent to the input power. Supposing the loss of the circuit and the motor to be small, the input power and the motor output power are also nearly equivalent. Since the motor rotating speed is known in the control circuit 25, by dividing the input current value by the motor rotating speed, a value nearly equivalent to the motor torque will be obtained. By using this equivalent value, the limiting value of the current phase to the voltage may be determined, and the weak-field system driving may be realized up to the limit in spite of wide torque changes, and a broad driving range may be realized.

Herein, the input power of the motor drive control device is used, but in a refrigerator, for example, the input power of the system may include a heater, aside from motor driving in the invention. In such a case, the control circuit 25 checks if the heater is being turned on or not, the electric power used in the heater may be subtracted, and the motor torque can be estimated at high precision, and a wider driving range may be realized.

(Embodiment 3)

Figure 5:
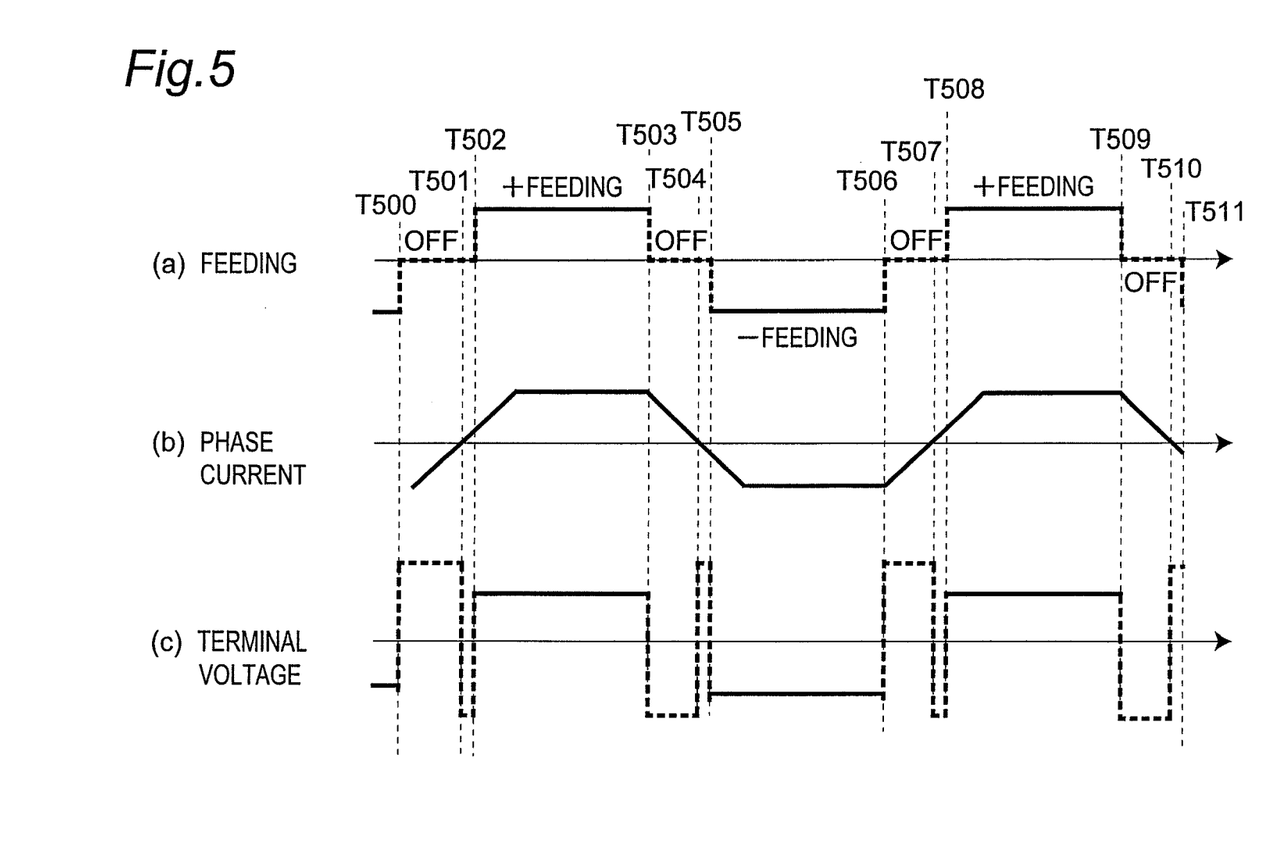
FIG. 5 is a waveform diagram of output signal of the motor drive control device in embodiment 3 of the invention.

FIG. 5(a) to (c) are waveform diagrams for realizing driving at high efficiency if there is a sufficient allowance in the voltage to be applied to the motor. FIG. 5(a) shows a feeding command by the semiconductor switch, in which feeding is cut off from time T500 to T502, positive direction feeding from time T502 to T503, feeding is cut off from time T503 to time T505, negative direction feeding from time T505 to T506, feeding is cut off again from time T506 to time T508, positive direction feeding from time T508 to T509, feeding is cut off from time T509 to time T511, and thus the combination of feeding off, positive direction feeding, feeding off, and negative direction feeding is repeated cyclically.

FIG. 5(b) shows the waveform of phase current in control state. The phase current is converted from negative to positive at time T501, and from positive to negative at T504, and similarly to positive at time T507, and to negative at T510.

FIG. 5(c) shows the waveform of terminal voltage. The solid line shows the portion in which the voltage is determined by feeding by turning on the semiconductor switch, and the broken line shows the portion in which the current is determined by feeding by turning off the semiconductor switch. In the feeding-off period, the terminal voltage is reverse in polarity to the current polarity. That is, when the feeding is cut off, the voltage polarity is known from the terminal voltage. In the control state shown in FIG. 5, it is controlled so that the current polarity may be inverted immediately before re-feeding. By controlling the feeding start time in this manner, the terminal voltage waveform shows an alternating waveform of plus voltage and minus voltage in each period of about 180 degrees.

In FIG. 5, the time difference of phase current and terminal voltage waveform is the difference between time T500 and T501, the difference between time T503 and T504, and the difference between time T506 and T507, and it can be easily determined in the control circuit 25. Since the time difference is equivalent to the phase difference, the feeding width may be adjusted so as to be equal to the desired phase difference. The desired phase difference may be decided so that the preliminarily determined efficiency may be the maximum value, or when the load torque is changed largely, in the same method as explained in embodiment 2, the approximate value of the motor torque vale may be estimated by using the input power, and on the basis of this value, a desired phase difference may be determined to achieve the maximum efficiency at each torque. To obtain the desired rotating speed, the applied voltage is adjusted to be lower than the maximum applicable voltage, and therefore the actual voltage may be equivalently lowered by pulse width modulation.

(Embodiment 4)

Figure 6A:
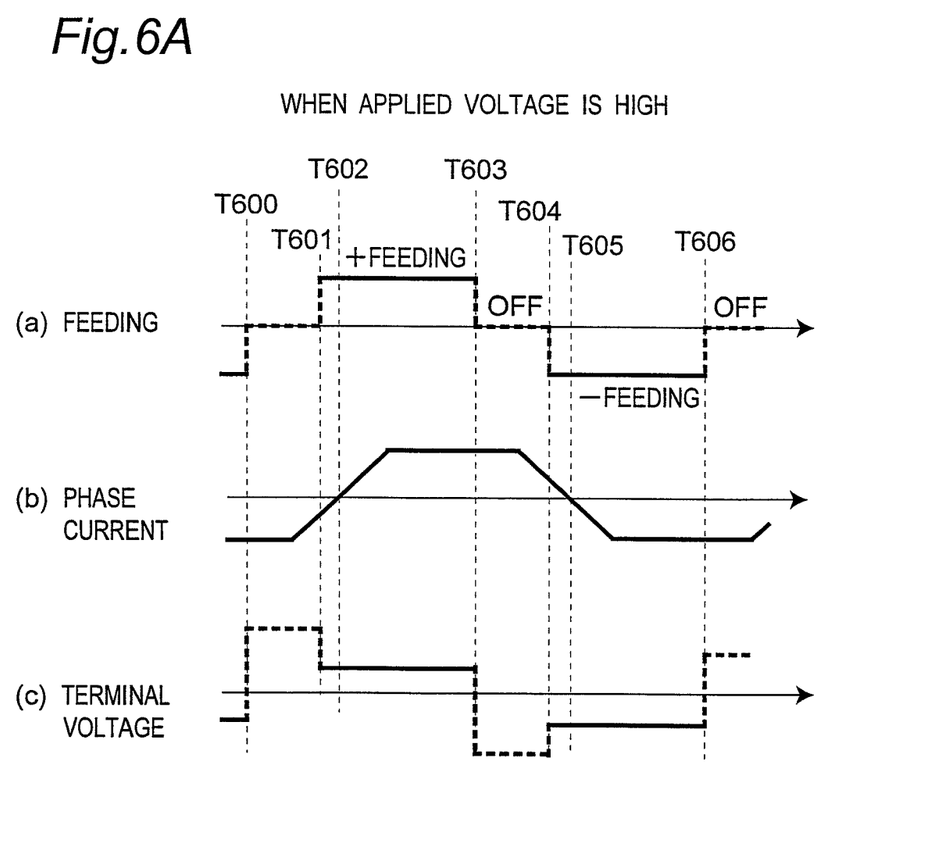
FIG. 6A is a waveform diagram of output signal of the motor drive control device in embodiment 4 of the invention.
Figure 6B:
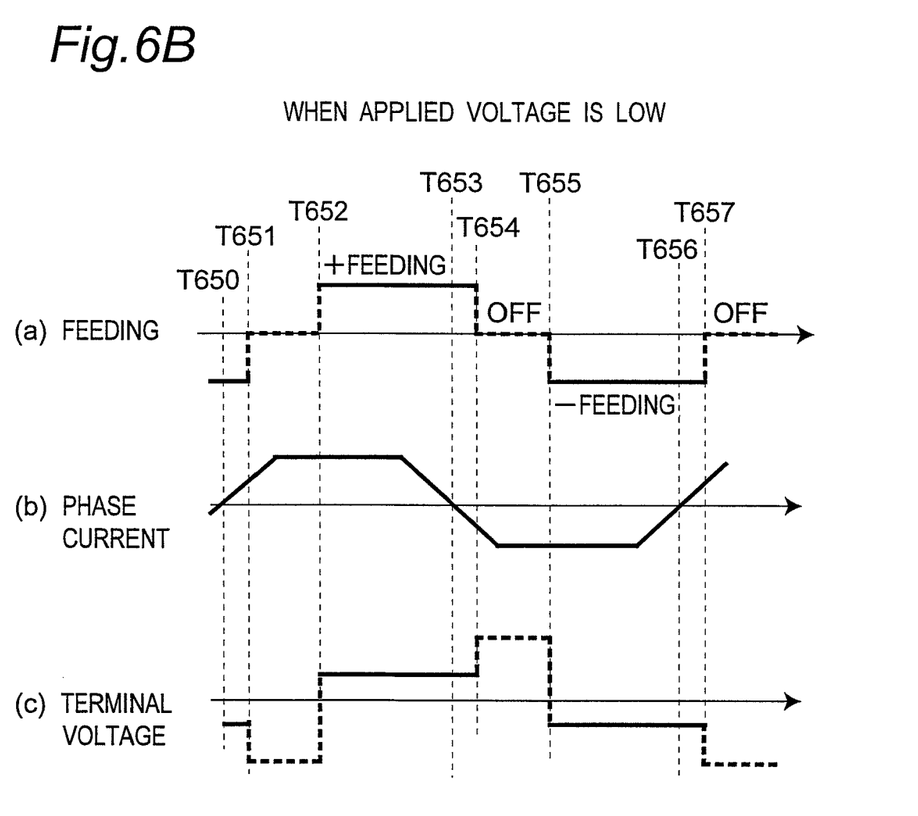
FIG. 6B is a waveform diagram of output signal of the motor drive control device in embodiment 4 of the invention.

FIG. 6A and FIG. 6B are waveform diagrams showing the control operation when starting up. In ultra-low speed rotation after start, the induced voltage is low, and it is hard to distinguish from rotation fluctuation, and it is hence difficult to modulate the feeding phase in driving. Accordingly, in the initial time of starting, feedback about rotation phase is skipped, and an alternating-current voltage of predetermined frequency is applied until the rotor of the motor is synchronized and rotated. FIG. 6A and FIG. 6B show waveforms to be started in such condition.

When the applied alternating-current voltage is higher than an appropriate voltage, as shown in FIG. 6A, the phase current is largely delayed in phase from the terminal voltage. That is, in the feeding-off period from time T600 to T601, the polarity of phase current is negative, and hence the terminal voltage is a maximum value in positive direction. In next feeding-off period from time T603 to T604, the polarity of phase current is positive, and hence the terminal voltage is a maximum value in negative direction. As a result, the phase current is delayed in phase from the terminal voltage.

When the applied alternating-current voltage is lower than an appropriate voltage, as shown in FIG. 6B, the phase current is largely advanced in phase from the terminal voltage. That is, in the feeding-off period from time T651 to T652, the polarity of phase current is positive, and hence the terminal voltage is a maximum value in negative direction. In next feeding-off period from time T654 to T655, the polarity of phase current is negative, and hence the terminal voltage is a maximum value in positive direction. As a result, the phase current is delayed in phase from the terminal voltage.

For more appropriate driving, on the basis of the same principle, the voltage width upon feeding is adjusted, so that the terminal voltage may be inverted in feeding-off time. As a result of confirming the starting operation in this manner, by transferring to the control system explained in embodiment 3, proper driving may be realized by the same circuit means from the very beginning of starting.

Industrial Applicability

The motor drive control device of the invention is capable of enhancing the driving efficiency in medium rotating speed range high in frequency of use, and realizing high speed rotation, without using current sensor or the like, or without adjusting the applied voltage changed moment by moment depending on changes in the voltage phase, and is therefore applicable in a wide range including the heat pump for obtaining cold heat or hot heat by compressing a refrigerant, such as refrigerator, air conditioner, heat pump type water heater, and other pumps and blowers.

The invention claimed is:

1. A motor drive control device having a three-phase full bridge circuit composed of elements having diodes for passing currents in reverse direction provided in parallel to each switching element, for converting a direct-current power supply, or a dummy direct-current power supply obtained by rectifying and smoothing an alternating-current supply, into a dummy three-phase alternating current of arbitrary voltage and arbitrary frequency in the three-phase full bridge circuit, and driving the motor at a desired rotating speed, wherein the dummy three-phase alternating current is a dummy three-phase alternating current cyclically repeating positive direction feeding period, non-feeding period, negative direction feeding period, and non-feeding period in each phase, further comprising:

a control circuit for detecting the terminal voltage of the motor in non-feeding period, obtaining the time of change of terminal voltage from positive to negative as the time of change of corresponding phase current from negative to positive, obtaining the time of change of terminal voltage from negative to positive as the time of change of corresponding phase current from positive to negative, and adjusting the phase of applied voltage so that the difference between the current phase based on each obtained current change time and the phase of alternating voltage at the motor terminal generated as a result of the applied voltage has a predetermined value, wherein in the dummy three-phase alternating current, the absolute value of terminal voltage generated from each bridge in feeding period is a constant voltage with respect to a neutral point potential of a direct-current portion, wherein the absolute value of terminal voltage generated from each bridge in the feeding period is adjusted on the basis of the deviation between an actual rotating speed and a desired rotating speed, and wherein when an actual rotating speed is lower than a desired rotating speed and if the absolute value of the terminal voltage is smaller than a maximum possible value, a ratio of non-feeding period is increased, and a feeding start phase is adjusted so that a current polarity is inverted right after coming into non-feeding period.

2. The motor drive control device according to claim 1, further comprising input detecting means for detecting an input current or an input power of the motor drive control device or a system including the motor drive control device, wherein an upper limit is provided for increasing the ratio of the non-feeding period on the basis of a calculated value of the output of the input detecting means divided by the actual rotating speed.

3. The motor drive control device according to claim 2, wherein in the system including the motor drive control device, if approximate values of power consumed in other parts than the motor driving are known preliminarily, a value subtracting the portion of the power consumed in other parts than the motor driving from the output of the input detecting means is used as the output of the input detecting means.

4. A motor drive control device having a three-phase full bridge circuit composed of elements having diodes for passing currents in reverse direction provided in parallel to each switching element for converting a direct-current power supply, or a dummy direct-current power supply obtained by rectifying and smoothing an alternating-current supply, into a dummy three-phase alternating current of arbitrary voltage and arbitrary frequency in the three-phase full bridge circuit, and driving the motor at a desired rotating speed, wherein the dummy three-phase alternating current is a dummy three-phase alternating current cyclically repeating positive direction feeding period, non-feeding period, negative direction feeding period, and non-feeding period in each phase, further comprising:

a control circuit for detecting the terminal voltage of the motor in non-feeding period, obtaining the time of change of terminal voltage from positive to negative as the time of change of corresponding phase current from negative to positive, obtaining the time of change of terminal voltage from negative to positive as the time of change of corresponding phase current from positive to negative, and adjusting the phase of applied voltage so that the difference between the current phase based on each obtained current change time and the phase of alternating voltage at the motor terminal generated as a result of the applied voltage has a predetermined value, wherein in the dummy three-phase alternating current, the absolute value of terminal voltage generated from each bridge in feeding period is a constant voltage with respect to a neutral point potential of a direct-current portion, wherein the absolute value of terminal voltage generated from each bridge in the feeding period is adjusted on the basis of the deviation between an actual rotating speed and a desired rotating speed, and wherein the absolute value of applied voltage to the terminal generated in the feeding period is set smaller than a maximum possible value, and when the desired rotating speed is realized, the ratio of the feeding period is increased, and the feeding is started after the terminal voltage in the non-feeding period is inverted, by controlling the feeding phase.

5. The motor drive control device according to claim 4, further comprising input detecting means for detecting an input current or an input power of the motor drive control device or a system including the motor drive control device, wherein the phase difference between a non-feeding starting phase, and the phase of inverting the terminal voltage in non-feeding period is determined on the basis of a calculated value of the output of the input detecting means divided by the actual rotating speed.

6. The motor drive control device according to claim 5, wherein in the system including the motor drive control device, if approximate values of power consumed in other parts than the motor driving are known preliminarily, a value subtracting the portion of the power consumed in other parts than the motor driving from the output of the input detecting means is used as the output of the input detecting means.

7. The motor drive control device according to claim 6, wherein a dummy three-phase alternating current cyclically repeating positive direction feeding period, non-feeding period, negative direction feeding period, and non-feeding period in each phase is applied at the time of starting, an applied voltage width is adjusted so that the terminal voltage is inverted in non-feeding period.

8. The motor drive control device according to claim 5, wherein a dummy three-phase alternating current cyclically repeating positive direction feeding period, non-feeding period, negative direction feeding period, and non-feeding period in each phase is applied at the time of starting, an applied voltage width is adjusted so that the terminal voltage is inverted in non-feeding period.

9. The motor drive control device according to claim 4, wherein a dummy three-phase alternating current cyclically repeating positive direction feeding period, non-feeding period, negative direction feeding period, and non-feeding period in each phase is applied at the time of starting, an applied voltage width is adjusted so that the terminal voltage is inverted in non-feeding period.

* * * * *